(12) United States Patent
Matsushita (10) Patent No.: US 8,511,989 B2
(45) Date of Patent: Aug. 20, 2013

(54) TEMPERATE CONTROL FOR WIND TURBINE GENERATOR

(75) Inventor: Takatoshi Matsushita, Nagasaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 872 days.

(21) Appl. No.: 12/513,253

(22) PCT Filed: Apr. 24, 2008

(86) PCT No.: PCT/JP2008/057908
§ 371 (c)(1),
(2), (4) Date: Jun. 15, 2009

(87) PCT Pub. No.: WO2008/142947
PCT Pub. Date: Nov. 27, 2008

(65) Prior Publication Data
US 2010/0066088 A1 Mar. 18, 2010

(30) Foreign Application Priority Data
May 18, 2007 (JP) .................................. 2007-132456

(51) Int. Cl.
*F03D 11/00* (2006.01)

(52) U.S. Cl.
USPC ........ 416/37; 416/1; 416/31; 416/39; 416/41; 416/95; 416/244 R; 416/244 A; 290/44; 290/55

(58) Field of Classification Search
USPC .................. 416/1, 31, 36, 37, 39, 41, 44, 61, 416/95, 244 R, 244 A; 415/2.1, 4.3, 4.5, 415/115, 116, 175–178, 905, 908; 290/44, 290/55
See application file for complete search history.

(56) References Cited

U.S. PATENT DOCUMENTS 6,676,122 B1  1/2004 Wobben
2005/0167989 A1*  8/2005 Kruger-Gotzmann et al. . 290/55
(Continued)

FOREIGN PATENT DOCUMENTS

JP   58-065977 A    4/1983
JP   2002-013467 A  1/2002
(Continued)

OTHER PUBLICATIONS

ISR for PCT/JP2008/057908 dated Jul. 22, 2008.
(Continued)

*Primary Examiner* — Christopher Verdier
(74) *Attorney, Agent, or Firm* — Kanesaka Berner & Partners, LLP (57) ABSTRACT

A wind turbine generator is provided in which the efficiency of heating the interior of a nacelle can be improved at a low outside air temperature in a cold region. The wind turbine generator includes a nacelle that accommodates a driving and generating mechanism connected to a rotor head fitted with turbine blades, wherein the nacelle is equipped with a lubricant-oil cooling fan and a generator cooling fan that ventilate the interior of the nacelle to prevent an increase in the temperature of the interior and a heating device that raises the temperature of the interior of the nacelle at a low outside air temperature, wherein the cooling fans can be operated with the rotating directions and the rotational speeds thereof being controlled, and during the operation of the heating device, the rotating directions and the rotational speeds of the cooling fans are controlled so as to make the wind velocity at the ventilation ports thereof about zero.

2 Claims, 9 Drawing Sheets

(56) References Cited

U.S. PATENT DOCUMENTS

2006/0220386 A1   10/2006  Wobben
2006/0290140 A1*  12/2006  Yoshida ......................... 290/55

FOREIGN PATENT DOCUMENTS

| | | |
|---|---|---|
| JP | 2006515400 A | 5/2006 |
| JP | 2007-002773 A | 1/2007 |
| JP | 2007-113518 A | 5/2007 |
| TW | 566483 U | 12/2003 |
| TW | 242587 U | 9/2004 |
| WO | 03/091577 A1 | 11/2003 |
| WO | WO-2007/051464 A1 * | 5/2007 |

OTHER PUBLICATIONS

Taiwan Office Action for Application No. 097116371 issued Jun. 30, 2011.

* cited by examiner

TEMPERATE CONTROL FOR WIND TURBINE GENERATOR

RELATED APPLICATIONS

The present application is a Nation Stage Entry of International Application Number PCT/JP2008/057908 filed Apr. 24, 2008, under 35 U.S.C. §371, and claims priority from Japanese Application Number 2007-132456 filed May 18, 2007, under 35 U.S.C. §119, the disclosures of which are hereby incorporated by reference herein in their entirety.

TECHNICAL FIELD

The present invention relates to a wind turbine generator that generates electricity using a wind turbine that converts natural wind energy to rotational power.

BACKGROUND ART

A known wind turbine generator in the related art generates electricity using wind power, which is natural energy. This type of wind turbine generator is configured such that a nacelle mounted on a tower is provided with a rotor head fitted with wind turbine blades, a main shaft connected to the rotor head so as to rotate together therewith, a gearbox connected to the main shaft that rotates by receiving wind power with the wind turbine blades, and a generator driven by the shaft output power of the gearbox. In the thus-configured wind turbine generator, the rotor head having the wind turbine blades that convert wind power to rotational power and the main shaft rotate to generate shaft output power, and the shaft output power, which is increased in rotational speed through the gearbox connected to the main shaft, is transmitted to the generator. Thus, power generation can be performed using the shaft output power obtained by converting wind power to rotational power as a driving source for the generator, that is, using wind power as motive power for the generator.

The conventional wind turbine generator described above is sometimes installed in a cold region in which the outside air temperature is low, at about −40° C. In such a cold region, problems such as changes in the properties of lubricant oil or low-temperature brittleness occur due to a decrease in outside air temperature; therefore, to cope with this, the devices in the nacelle are heated to a predetermined temperature using a heater or the like.

On the other hand, because the nacelle accommodates devices that generate heat during operation, such as a gearbox and a generator, a cooling structure is employed in which an air intake port and an air exhaust port are formed for preventing an increase in temperature by ventilating the nacelle interior using a fan operated by a wind turbine (for example, refer to Patent Document 1).

For wind turbine generators, a cooling mechanism has been proposed which releases heat generated from the generator to wind that has rotated a rotor, through a plurality of fins provided on a frame that partitions the outer peripheral surface of the generator and outside air from each other. This cooling mechanism does not need an air intake port, an air exhaust port, and a cooling fan (for example, refer to Patent Document 2).

Patent Document 1: Japanese Unexamined Patent Application, Publication No. Sho 58-65977
Patent Document 2: Japanese Unexamined Patent Application, Publication No. 2002-13467

DISCLOSURE OF INVENTION

Some wind turbine generators installed in a cold region are equipped with a cooling structure that prevents an increase in the temperature of the nacelle interior by operating a cooling fan and a heating structure that heats the nacelle interior by operating a heater at a low outside air temperature. In particular, recent wind turbine generators tend to have increased generating capacity owing to their larger wind turbine blades, which requires a cooling device having even higher cooling capacity to cope with an increase in the amount of heat generated in the nacelle. However, with a system in which ventilation is performed through an air intake port and an air exhaust port provided at the nacelle, an opening area for ventilation also increases because the increase in cooling capacity translates to an increase in ventilation air volume. Therefore, a problem has been noted in that, at a low outside air temperature at which the nacelle interior is to be heated, the temperature of the nacelle interior that is heated is decreased in spite of all the efforts due to an increase in the amount of low-temperature outside air flowing through the openings of the air intake port and a ventilation port, thus exerting a negative influence on heating efficiency.

Against such a backdrop, opening and closing mechanisms, such as opening and closing louvers, are provided at the ventilation ports (air intake port and air exhaust port), and when operating the heating device, the openings are shut to minimize the opening areas. However, this has a problem in that the above-described opening and closing mechanisms become seized due to adhesion of ice and snow or freezing at a low outside air temperature in a cold region because the opening and closing mechanisms are in direct contact with outside air, which makes an opening and closing action impossible.

The present invention is made in consideration of the above-described circumstances, and it is an object thereof to provide a wind turbine generator in which, even at a low outside air temperature in a cold region, malfunction of the mechanism for opening and closing the ventilation port is less prone to occur, thus increasing the reliability and improving the efficiency of heating the nacelle interior.

The present invention adopts the following solutions to solve the above-described problems.

A wind turbine generator according to a first aspect of the present invention is a wind turbine generator in which a nacelle that accommodates a driving and generating mechanism connected to a rotor head fitted with turbine blades is equipped with a cooling device that ventilates the nacelle interior to prevent an increase in the temperature of the interior and a heating device that raises the temperature of the nacelle interior at a low outside air temperature, wherein a ventilating fan of the cooling device can be operated with the rotating direction and the rotational speed thereof being controlled, and during the operation of the heating device, the rotating direction and the rotational speed of the ventilating fan are controlled so as to make the wind velocity at a ventilation port about zero.

With the wind turbine generator according to the first aspect of the present invention, the ventilating fan of the cooling device can be operated with the rotating direction and the rotational speed thereof being controlled, and during the operation of the heating device, the rotating direction and the rotational speed of the ventilating fan are controlled so as to make the wind velocity at the ventilation port about zero. Therefore, even under conditions where there is a need for a heating mode in a cold-region installation environment, low-temperature outside air can be reliably prevented from flowing into the nacelle through the ventilation port without concern for seizing due to freezing or the like. That is, under conditions where there is a need for a heating mode, the wind velocity at the ventilation port is brought to about zero to create substantially the same conditions as when the ventilation port is closed.

In the wind turbine generator according to the first aspect, it is preferable that the rotating direction and the rotational speed of the ventilating fan be set by inverter control of an electric motor of the ventilating fan on the basis of measured values from wind-direction and a wind-velocity detection part for measuring the flow direction and the flow velocity of air flowing through the ventilation port. This not only makes it easy to control the operation of the ventilating fan to make the wind velocity at the ventilation port about zero but also allows fine control.

A wind turbine generator according to a second aspect of the present invention is a wind turbine generator in which a nacelle that accommodates a driving and generating mechanism connected to a rotor head fitted with turbine blades is equipped with a cooling device that ventilates the nacelle interior to prevent an increase in the temperature of the interior and a heating device that raises the temperature of the nacelle interior at a low outside air temperature, wherein the wind turbine generator includes a bag-like inflating and deflating member disposed at the ventilation port and connected to a compressed-fluid supply part, wherein the inflating and deflating member closes the ventilation port by inflation upon receiving the compressed fluid supply during the operation of the heating device and opens the ventilation port by deflation upon releasing the compressed fluid during the operation of the cooling device.

The wind turbine generator according to the second aspect of the present invention includes a bag-like inflating and deflating member disposed at the ventilation port and connected to a compressed-fluid supply part, wherein the inflating and deflating member is configured to close the ventilation port by inflation upon receiving the compressed fluid supply during the operation of the heating device and to open the ventilation port by deflation upon releasing the compressed fluid during the operation of the cooling device. Therefore, even in a cold-region installation environment, the ventilation port can reliably be opened and closed without seizing due to freezing or the like.

A wind turbine generator according to a third aspect of the present invention is a wind turbine generator in which a nacelle that accommodates a driving and generating mechanism connected to a rotor head fitted with turbine blades is equipped with a cooling device that ventilates the nacelle interior to prevent an increase in the temperature of the interior and a heating device that raises the temperature of the nacelle interior at a low outside air temperature, wherein the wind turbine generator includes a compressed-air releasing part disposed in the vicinity of the ventilation port and connected to a compressed-fluid supply part, wherein the compressed-air releasing part closes the ventilation port by means of the flow of compressed fluid released upon receiving the compressed fluid supply during the operation of the heating device.

The wind turbine generator according to the third aspect of the present invention includes a compressed-air releasing part disposed in the vicinity of the ventilation port and connected to a compressed-fluid supply part, wherein the compressed-air releasing part is configured to close the ventilation port by means of the flow of compressed fluid released upon receiving the compressed fluid supply during the operation of the heating device. Therefore, even in a cold-region installation environment, the ventilation port can reliably be opened and closed without seizing due to freezing or the like.

According to the wind turbine generator of the present invention described above, under conditions where there is a need for a heating mode, the wind velocity at the ventilation port is brought to about zero to create substantially the same state as when the ventilation port is closed, or the ventilation port is opened and closed by means of the inflated bag-like inflating and deflating member or the flow of compressed fluid, thus eliminating a mechanical movable structural part that becomes tightly seized by freezing or the like in a cold-region installation environment. Accordingly, even at a low outside air temperature at which the nacelle interior is heated, the ventilation port is reliably closed to prevent low-temperature outside air from flowing in, thereby allowing efficient heating of the nacelle interior by means of a heater or the like.

EXPLANATION OF REFERENCE SIGNS

1: wind turbine generator
2: tower
3: nacelle
4: rotor head
5: wind turbine blade
7: anemoscope/anemometer
10: gearbox
11: generator
12: air intake port
14: lubricant-oil cooling fan
15: exhaust duct 15
17: generator cooling fan
15a, 16a: exhaust port
20, 20A: nacelle control unit
22, 23: inverter
30: air-intake-port inside anemoscope/anemometer
40: balloon
41: intake-air shutoff compressor
50: air curtain nozzle

BEST MODE FOR CARRYING OUT THE INVENTION

An embodiment of a wind turbine generator according to the present invention will be described hereinbelow with reference to the drawings.

Figure 2:
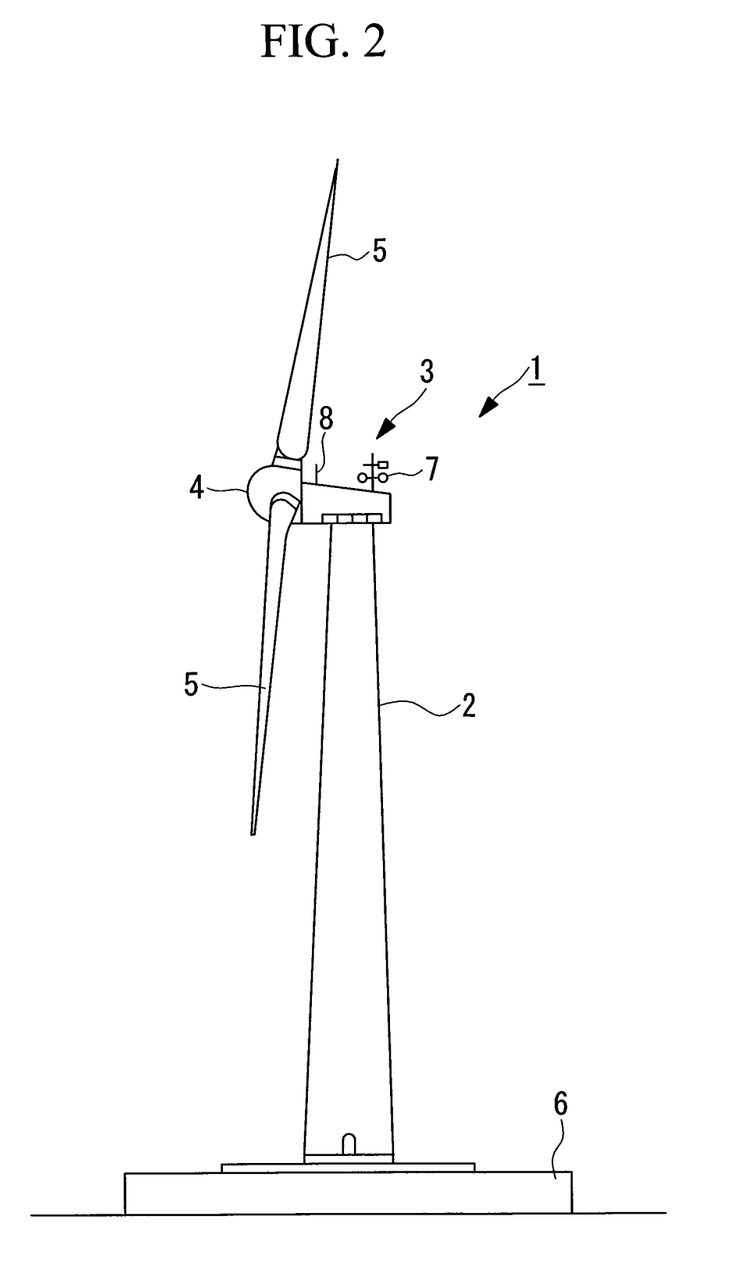
FIG. 2 is a diagram showing an example of the overall configuration of the wind turbine generator.

As shown in FIG. 2, a wind turbine generator 1 includes a tower 2 that is vertically erected on a foundation 6, a nacelle 3 mounted on the upper end of the tower 2, and a rotor head 4 mounted on the nacelle 3 so as to be rotatable about the substantially horizontal axis thereof.

The rotor head 4 has a plurality of wind turbine blades 5 mounted radially about its rotation axis. As a result, the power of wind blowing against the wind turbine blades 5 from the direction of the rotation axis of the rotor head 4 is converted to motive power that rotates the rotor head 4 about the rotation axis.

An anemoscope/anemometer 7 that measures the peripheral wind direction and wind velocity value and a lightning rod 8 are provided at appropriate positions (for example, at the top etc.) of the circumferential surface of the nacelle 3.

For this wind turbine generator 1, the present invention provides a mechanism for preventing or reducing entry of outside air through a ventilation port, which is an opening provided for ventilation of the interior of the nacelle 3, at a low outside air temperature in a cold region, thereby improving the heating efficiency of heating the interior of the nacelle 3.

The configuration of the mechanism for preventing or reducing entry of outside air into the nacelle 3 (hereinafter referred to as "nacelle closing mechanism" will be specifically described hereinbelow. The ventilation port for ventilating the interior of the nacelle 3 includes an air intake port serving as an outside air inlet and an exhaust port serving as an outlet, both of which are collectively referred to as a ventilation port.

First Embodiment

In a first embodiment, the nacelle closing mechanism which prevents or reduces entry of outside air into the nacelle 3 by controlling the rotating direction and rotational speed of a cooling ventilating fan provided at the nacelle 3 of the wind turbine generator 1 will be described.

Figure 3:
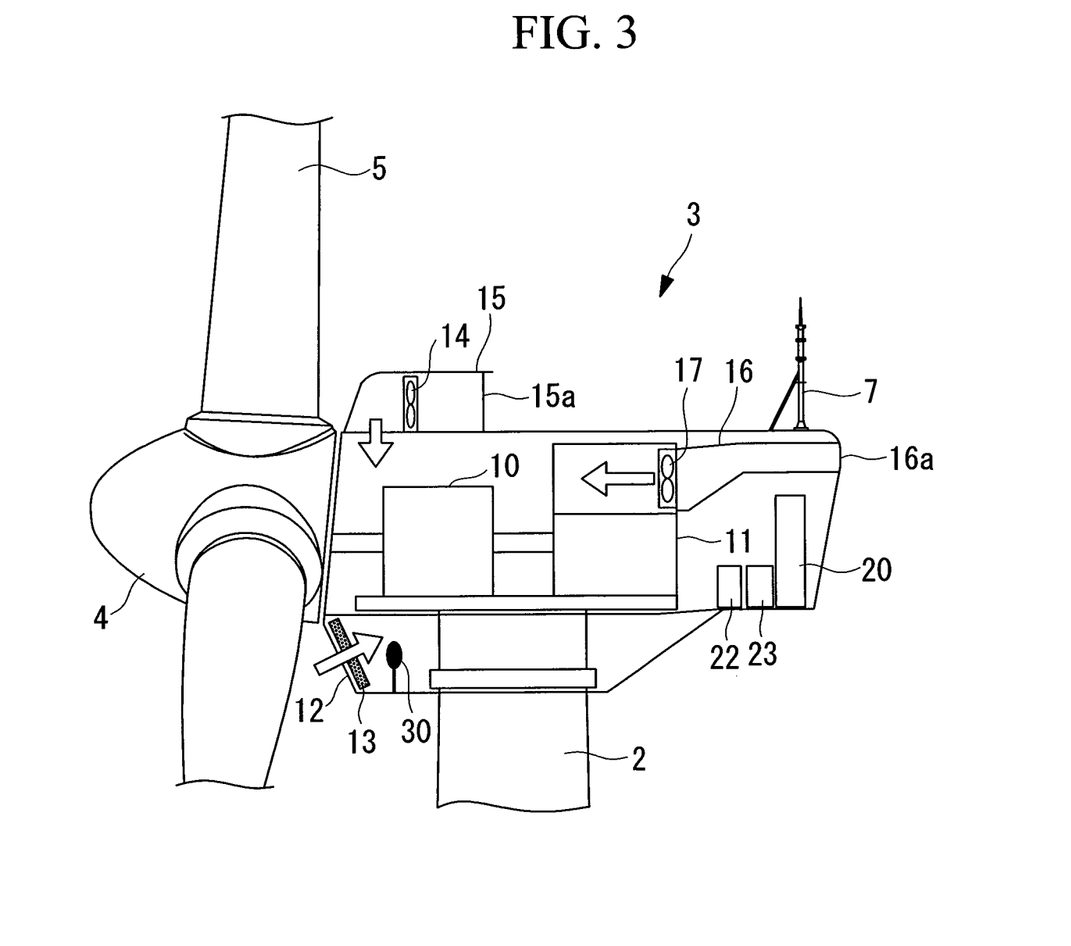
FIG. 3 is a sectional view showing an example of the internal configuration of a nacelle in the first embodiment.

As shown in FIG. 3, for example, the nacelle 3 accommodates a driving and generating mechanism equipped with a generator 11 that is connected to the rotor head 4 via a gearbox 10. That is, generator output power W is obtained from the generator 11 by driving the generator 11 while increasing the rotational speed of the rotor head 4 with the gearbox 10.

The above-described nacelle 3 has a ventilating and cooling device that circulates introduced outside air therethrough and thereafter exhausts it to the outside of the nacelle so as to prevent an internal temperature rise during operation.

In the configuration example of the ventilating and cooling device shown in FIG. 3, an air intake port 12 for naturally letting in outside air opens at the lower front of the nacelle 3, and the air intake port 12 is provided with an intake air filter 13.

On the top of the nacelle 3, a lubricant-oil cooling fan 14 mainly for cooling lubricant oil of the gearbox 10 is mounted in an exhaust duct 15, and a generator cooling fan 17 mainly for cooling the generator is mounted at a generator exhaust duct 16 formed in the nacelle 3. By operating these two cooling fans 14 and 17 to rotate in a rotating direction during normal cooling operation (hereinafter referred to as "rotation in normal direction"), outside air introduced through the air intake port 12 passes through the nacelle 3 to cool the gearbox lubricant oil, the generator 11, etc. and is thereafter exhausted to the outside of the nacelle 3 through exhaust ports 15a and 16a of the exhaust duct 15 and the generator exhaust duct 16.

The operations of various devices, including the above-described lubricant-oil cooling fan 14 and generator cooling fan 17, are controlled by a nacelle control unit 20 installed in the nacelle 3.

Here, the rotational speed of the lubricant-oil cooling fan 14 is controlled by an inverter 22 for the lubricant-oil cooling fan, which is connected to a power supply 21, and the rotational speed of the generator cooling fan 17 is controlled by an inverter 23 for the generator cooling fan, which is connected to the power supply 21. The nacelle 3 is further provided with a heating device 24, such as a heater, for heating the interior of the nacelle in cold weather etc. This heating device 24 is connected to the power supply 21 to receive electric power, and its operation, such as ON/OFF, is controlled by the nacelle control unit 20.

For the thus-configured wind turbine generator 1, this embodiment is provided with a nacelle closing mechanism configured using the ventilating and cooling device for the nacelle 3.

Figure 1:
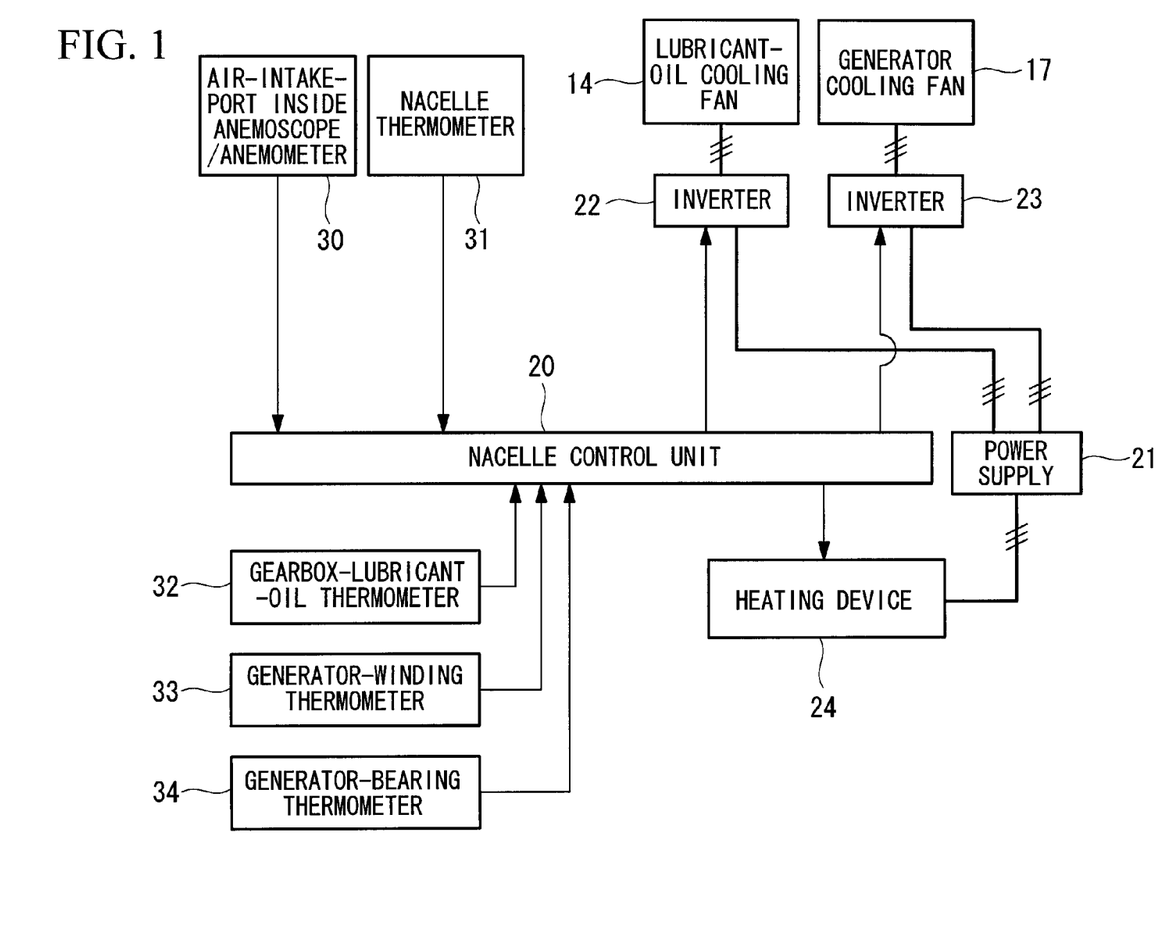
FIG. 1 is a block diagram of relevant parts showing a first embodiment of a wind turbine generator according to the present invention.

As shown in FIG. 1, for example, the nacelle closing mechanism of this embodiment is provided with an air-intake-port inside anemoscope/anemometer 30 and a nacelle thermometer 31, which are mounted at appropriate positions in the nacelle 3, for controlling the rotating directions and rotational speeds of the lubricant-oil cooling fan 14 and the generator cooling fan 17 described above.

The nacelle 3 is also provided with, at appropriate positions therein, for example, a gearbox-lubricant-oil thermometer 32, a generator-winding thermometer 33, and a generator-bearing thermometer 34 to obtain information for determining the operating conditions of the heating device 24.

The air-intake-port inside anemoscope/anemometer 30 is disposed in the vicinity of the inner side of the air intake port 12 and detects the flow direction of outside air introduced into the nacelle 3 and the wind velocity, which is the flow velocity thereof, the detection values of which are input to the nacelle control unit 20. The nacelle thermometer 31 measures the internal temperature of the nacelle 3, the measured value of which is input to the nacelle control unit 20. In this case, the installation position of the air-intake-port anemoscope/anemometer 30 is set in the vicinity of the inner side of the air intake port 12, but is not limited thereto; it may be disposed in the vicinity of the inner side of the exhaust port 15a or 16a, that is, one of the ventilation ports or at an intermediate point in the nacelle 3. However, the configuration having the two exhaust ports 15a and 15b needs two anemoscopes/anemometers, and the wind direction and wind velocity at an intermediate point in the nacelle 3 are irregular due to the placement etc. of the internal devices; therefore, like the air-intake-port inside anemoscope/anemometer 30, an installation position where the direction and velocity of wind passing through the air intake port 12 can be easily and accurately detected by one air-intake-port anemoscope/anemometer 30 is preferable.

Likewise, the gearbox-lubricant-oil thermometer 32 measures the lubricant-oil temperature of the gearbox 10, the generator-winding thermometer 33 measures the winding temperature of the generator 11, and the generator-bearing thermometer 34 measures the bearing temperature of the generator 11; therefore, the measured temperatures thus obtained are input to the nacelle control unit 20.

Figure 4:
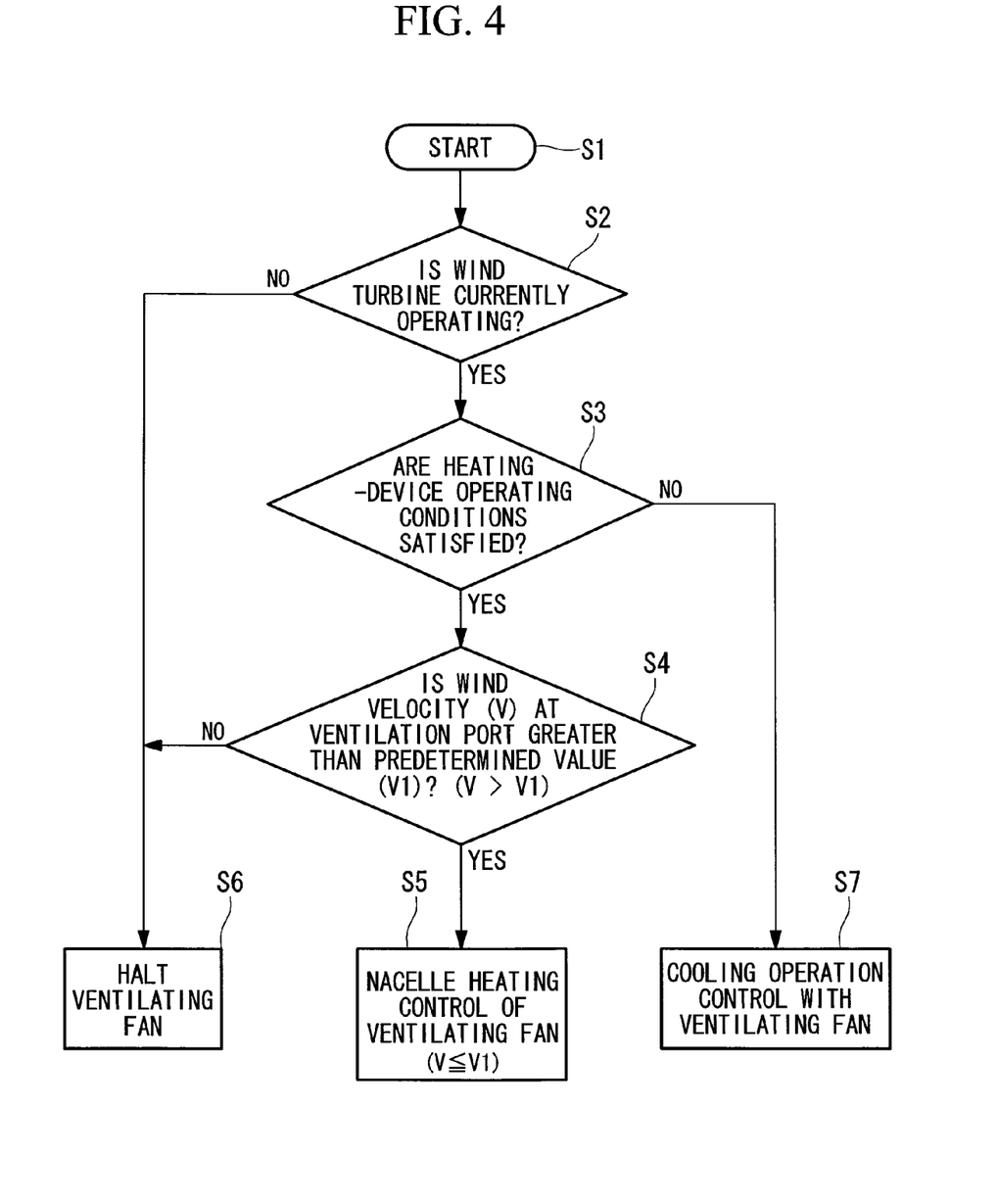
FIG. 4 is a flowchart showing an example of control of a ventilating fan executed by a nacelle control unit in FIG. 1.

Subsequently, control for the nacelle closing mechanism of the above-described nacelle control unit 20 will be described on the basis of the flowchart in FIG. 4.

When the control is started in the first step S1, the process proceeds to step S2, where it is determined whether the wind turbine generator (wind turbine) 1 is operating. If the result is YES, that is, the wind turbine generator 1 is operating, the process proceeds to the next step S3, where it is determined whether the operating conditions for the heating device 24 are satisfied. This determination is made on the basis of the measured values from the nacelle thermometer 31, the gearbox-lubricant-oil thermometer 32, the generator-winding thermometer 33, the generator-bearing thermometer 34, and so on. Specifically, when all temperature conditions are satisfied, for example, when the measured value from the nacelle thermometer 31 is low, lower than or equal to 0° C., the measured value from the gearbox-lubricant-oil thermometer 32 is lower than or equal to 50° C., the measured value from the generator-winding thermometer 33 is lower than or equal to 100° C., and the measured value from the generator-bearing thermometer 34 is lower than or equal to 80° C., it is determined that the operating conditions of the heating device 24 are satisfied.

Under the conditions and environments where the heating mode is to be used, the determination in step S3 is YES, and the process proceeds to the next step S4.

In step S4, a determination is made using the measured value from the air-intake-port inside anemoscope/anemometer 30 that detects the direction and velocity of wind passing through the air intake port 12 among the ventilation ports of the air intake port 12 and the exhaust ports 15a and 16a. That is, it is determined whether or not a wind velocity V detected by the air-intake-port inside anemoscope/anemometer 30 is greater than a predetermined value V1 (V>V1). For the wind velocity V here, absolute values are adopted for wind-velocity detection values in the direction flowing from the exterior into the nacelle 3 and in the direction flowing from the interior of the nacelle 3 to the exterior. The predetermined value V1 is a small value close to a wind velocity 0; for example, it is set to about V1=1 m/s. Also for the predetermined value V1 in this case, an absolute value regardless of the flow direction is adopted.

If the determination in step S4 is YES, that is, the detected wind velocity V is greater than the predetermined value (V>V1), the process proceeds to the next step S5, where nacelle heating control of the ventilating fans is performed. The number of ventilating fans in this case is two, that is, the lubricant-oil cooling fan 14 and the generator cooling fan 17; however, with a configuration having another similar ventilating fan, all the ventilating fans for ventilating and cooling the interior of the nacelle 3 are included.

The above-described nacelle heating control is feedback control so as to maintain the wind velocity detected from the air-intake-port inside anemoscope/anemometer 30 at a value lower than or equal to the predetermined value V1 (V≦V1) by finely adjusting the rotating directions and rotational speeds of the lubricant-oil cooling fan 14 and the generator cooling fan 17 controlled by the inverters.

In the nacelle heating control described above, for example, the rotating directions of the lubricant-oil cooling fan 14 and the generator cooling fan 17 are reversed, and the rotational speeds are slowed down by inverter control so that the velocity of wind passing through the air intake port 12 is controlled substantially to zero or a value close to zero. In such a state, the air heated in the nacelle 3 hardly flows out of the nacelle through the exhaust ports 15a and 16a and also hardly flows out of the nacelle through the air intake port 12. Accordingly, this prevents or inhibits the air in the nacelle 3 that is heated to a high temperature by the heating device 24 from being replaced with low-temperature outside air to flow to the exterior, thus allowing the interior of the nacelle 3 to be efficiently heated. That is, with this nacelle heating control, the ventilation ports through which the interior of the nacelle 3 is cooled and ventilated are brought to a substantially closed state, which is effective in increasing the heating efficiency when it is necessary to heat the interior of the nacelle 3 because of low outside-air temperature or the like.

In the above wind-velocity control, the control of the velocity of wind passing through the air intake port 12 substantially to zero or a value close to zero should be performed so that an absolute value thereof becomes lower than or equal to 1 m/s, judging from the general measuring capacity of the air-intake-port inside anemoscope/anemometer 30. That is, in actual control, since the minimum value of wind velocity that can be measured by a common anemoscope/anemometer is about 1 m/s, 1 m/s should be adopted as the predetermined value V1 for which the absolute value regardless of the wind direction is adopted.

If the result in the above step S2 is No, that is, the wind turbine generator 1 is not being operated, or if the result in step S4 is NO, that is, the detected wind velocity V is lower than the predetermined value V1, the process proceeds to step S6, where the operation of the ventilating fans is halted. That is, when the wind turbine generator 1 is halted, the operation of the ventilating fan is not needed, and also when the wind velocity V is lower than the predetermined value V1, it is not necessary to close the ventilation ports by controlling the operation of the ventilating fans because the amount of ventilation in the nacelle 3 is smaller than the target control value.

If the result in the above step S3 is NO, that is, the operating conditions for the heating device are not satisfied, heating of the interior of the nacelle 3 by the heating device 24 is not performed. Therefore, the process proceeds to the next step S7, where normal cooling operation control with the ventilating fans is performed.

Unlike the opening and closing mechanisms, such as the opening and closing louvers, provided at the ventilation ports, including the air intake port 12, such a nacelle closing mechanism that controls the rotating directions and rotational speeds of the ventilating fans is not in direct contact with low-temperature outside air, and ice and snow do not stick thereto, so that its opening and closing operation is not disabled due to freezing or the like.

Second Embodiment

A second embodiment of the present invention will be described with reference to FIGS. 5 to 8. The same components as those in the foregoing embodiment are given the same reference numerals and detailed descriptions thereof will be omitted.

Figure 5:
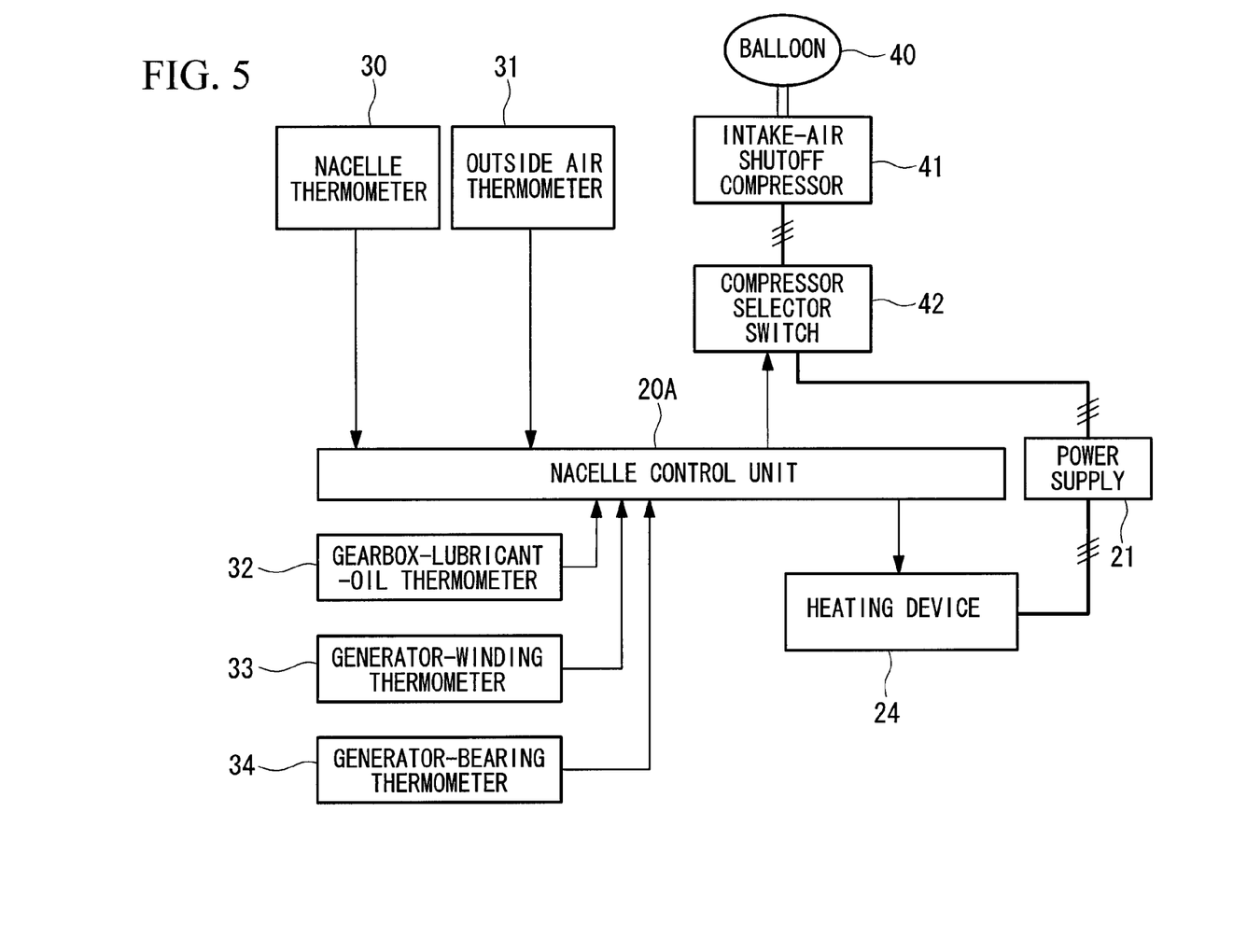
FIG. 5 is a block diagram of relevant parts showing a second embodiment of a wind turbine generator according to the present invention.

In this embodiment, a bag-like inflating and deflating member connected to a compressed-fluid supply part is provided, as a nacelle closing mechanism, at the air intake port 12, which is one of the ventilation ports. The inflating and deflating member in this case is a balloon 40, which closes the air intake port 12 by means of the balloon shape during inflation upon receiving the compressed air supplied from an intake-air shutoff compressor 41 of the compressed-fluid supply part and which opens the air intake port 12 during deflation upon releasing the compressed air.

Figure 7A:
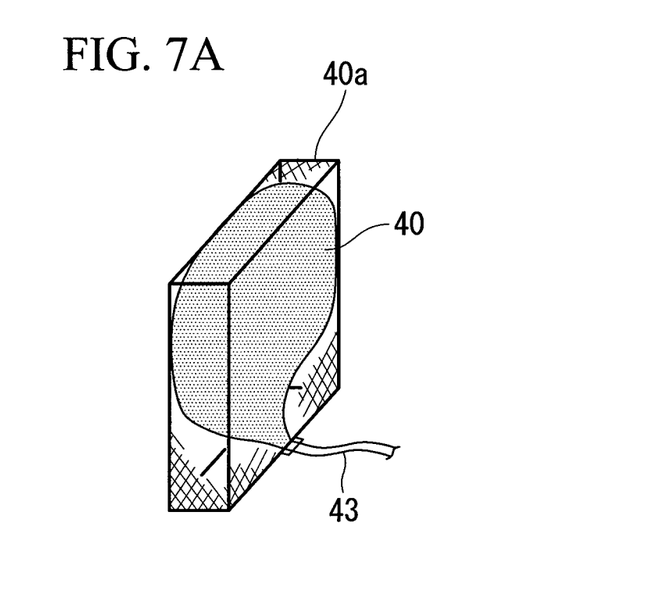
FIG. 7A is a perspective view showing, in enlarged form, a configuration example of a balloon for opening and closing an air intake port.
Figure 7B:
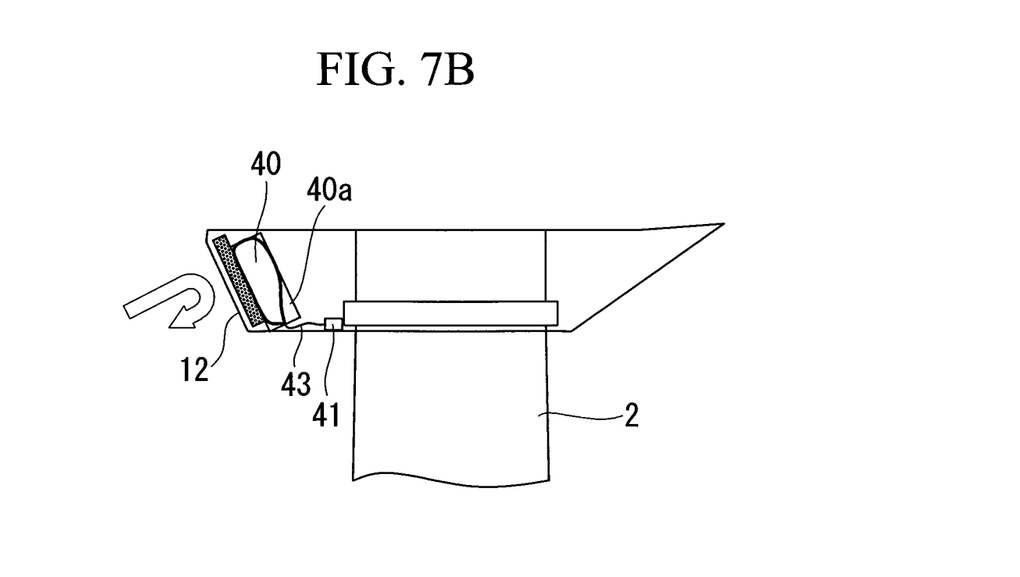
FIG. 7B is a side view of a relevant part showing a configuration example of the balloon for opening and closing the air intake port.

As shown in FIGS. 7A and 7B, for example, the balloon 40 is accommodated in a cover member 40a that defines the shape during inflation. It is preferable not only that this cover member 40a define the inflated shape of the balloon 40 disposed inside as a hollow rectangular shape, for example, but also that at least a surface serving as a passage be made of, for example, a net or lattice-like member so as not to hinder the circulation of air during deflation.

Figure 6:
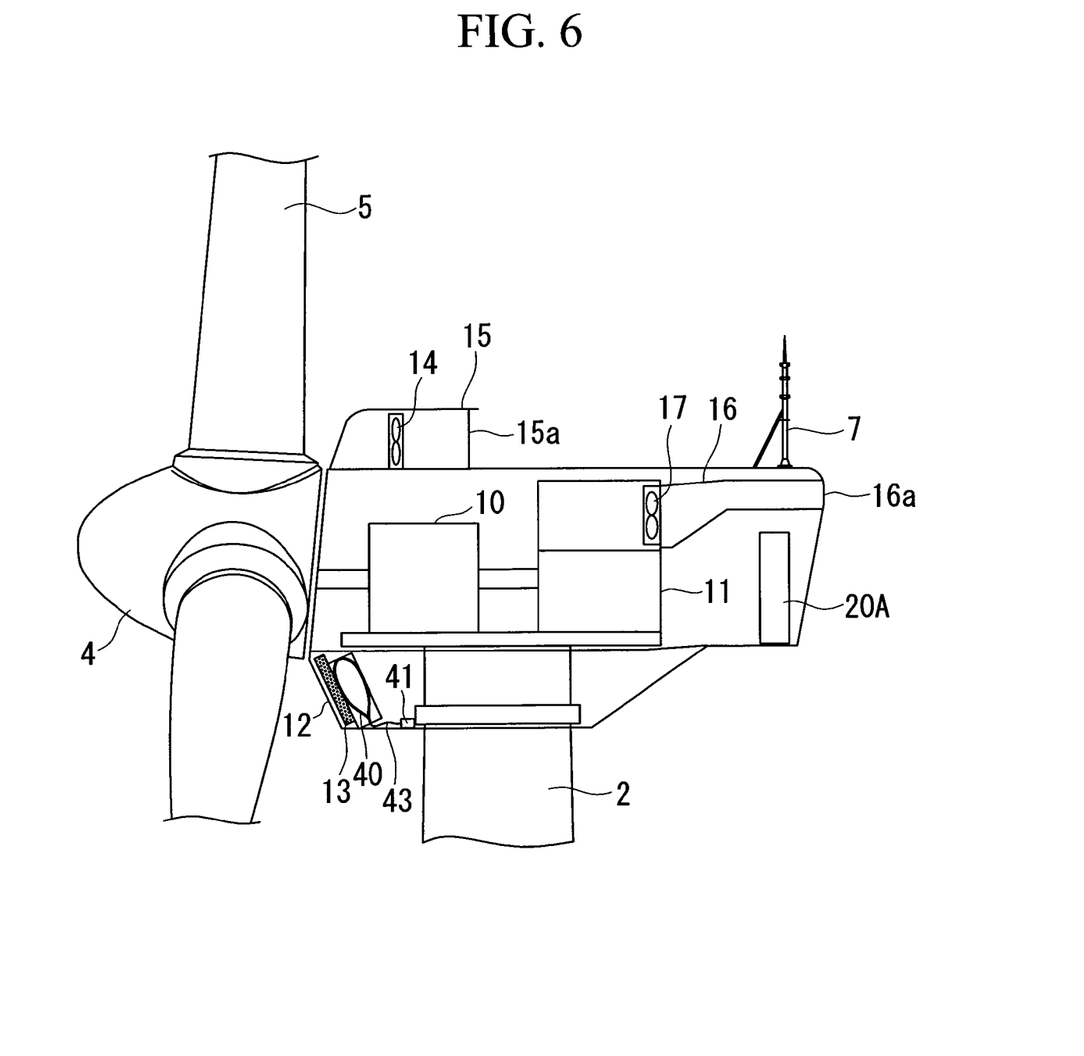
FIG. 6 is a sectional view showing an example of the internal configuration of a nacelle in the second embodiment.

The intake-air shutoff compressor 41 that supplies compressed air for inflating the balloon 40 is connected to the power supply 21 via a compressor selector switch 42 whose ON/OFF state is controlled by a nacelle control unit 20A. As shown in FIG. 6, for example, the intake-air shutoff compressor 41 is disposed at an appropriate position in the nacelle 3 and is connected to the balloon 40 through a compressed-air passage 43 formed of a pipe, a high-pressure hose, etc.

The nacelle closing mechanism with the above configuration is subjected to inflation and deflation control by the nacelle control unit 20A. The inflation and deflation control of the balloon 40 will be described hereinbelow with reference to the flowchart in FIG. 8.

Figure 8:
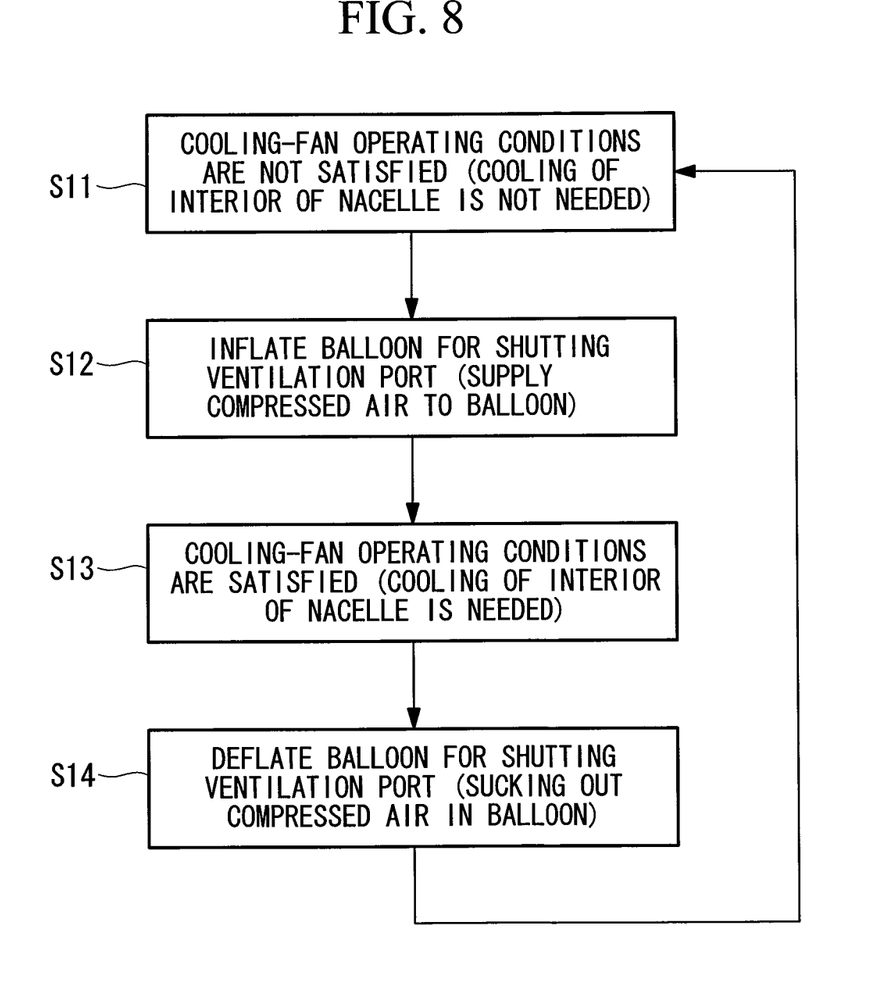
FIG. 8 is a flowchart showing an example of control of a ventilating fan executed by a nacelle control unit in FIG. 5.

If cooling-fan operating conditions are not satisfied in step S11, that is, if there is no need to cool the interior of the nacelle 3, the process proceeds to step S12, where the balloon 40 for shutting the ventilation port is inflated. That is, the nacelle control unit 20A turns the compressing-mechanism selector switch 42 from OFF to ON to supply power from the power supply 21 to the intake-air shutoff compressor 41, thereby starting the operation. As a result, the balloon 40 is supplied with compressed air and is inflated, and the balloon 40 inflated in the cover member 40a closes the air intake port 12. Therefore, the air heated in the nacelle 3 by the heating device 24 is hindered from flowing out of the nacelle 3, allowing efficient heating.

If the cooling-fan operating conditions are satisfied in the next step S13, that is, if it becomes necessary to cool the interior of the nacelle 3, the process proceeds to step S14, where the balloon 40 for shutting the ventilation port is deflated. That is, when the balloon 40 is deflated by sucking out the air in the balloon 40 etc., the air intake port 12 is opened to allow the ventilation and cooling of the interior of the nacelle 3.

Also with such a configuration, unlike the opening and closing mechanisms, such as the opening and closing louvers, provided at the ventilation ports, including the air intake port 12, the nacelle closing mechanism for inflating and deflating the balloon 40 is not in direct contact with low-temperature outside air, and ice and snow do not stick thereto, so that its opening and closing operation is not disabled due to freezing or the like.

Third Embodiment

Figure 9:
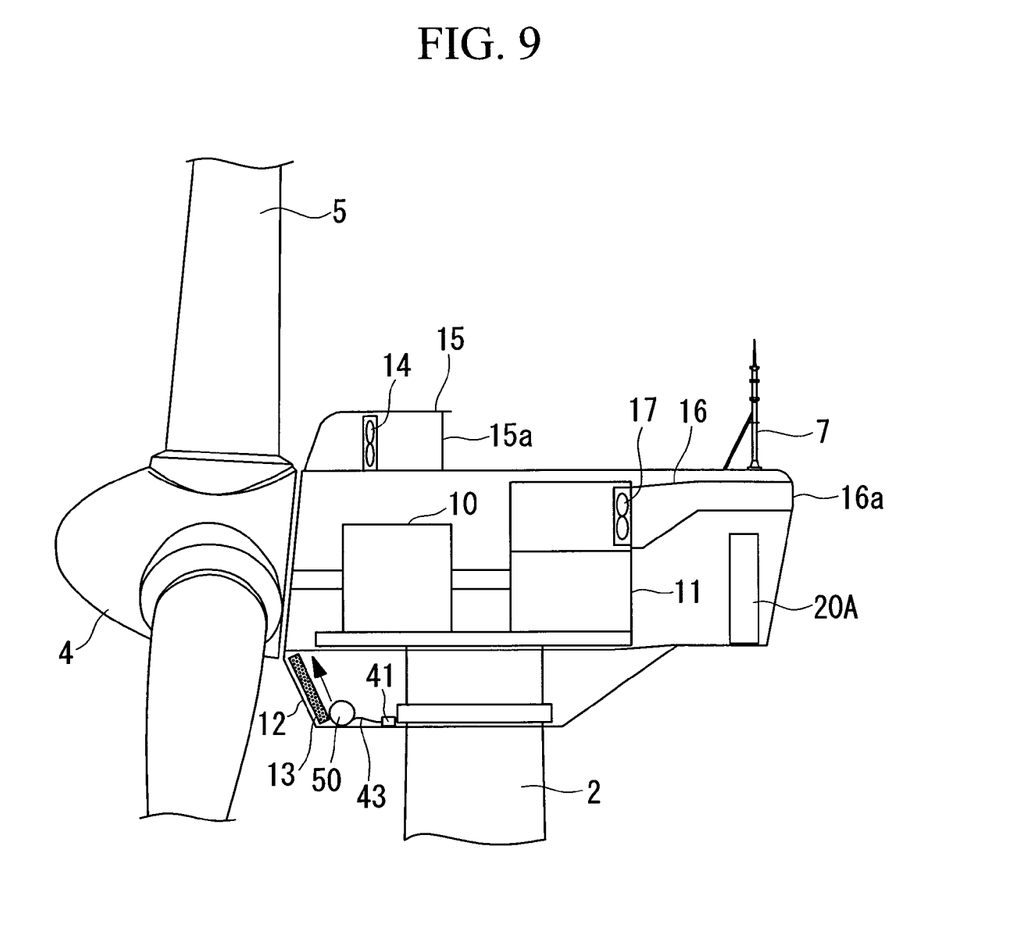
FIG. 9 is a block diagram of relevant parts showing a third embodiment of a wind turbine generator according to the present invention.

A third embodiment of the present invention will be described with reference to FIG. 9. The same components as those in the foregoing embodiments are given the same reference numerals and detailed descriptions thereof will be omitted.

In this embodiment, as a nacelle closing mechanism, the ventilation port is closed by means of the flow of compressed fluid. That is, it has a configuration and control in which the balloon 40 in the second embodiment described above is changed to an air curtain nozzle 50, in which, instead of inflating the balloon 40, compressed air is made to flow out through the air curtain nozzle 50 to form an air curtain, and instead of deflating the balloon 40, the supply of the compressed air to the air curtain is stopped.

With such a configuration and control, when the air curtain, which is a flow of compressed air, is formed, the air intake port 12 becomes closed, and when no air curtain is formed, the air intake port 12 becomes opened. Accordingly, also with such a configuration, unlike the opening and closing mechanisms, such as the opening and closing louvers, provided at the ventilation ports, including the air intake port 12, the nacelle closing mechanism that forms the air curtain is not in direct contact with low-temperature outside air, and ice and snow do not stick thereto, so that the opening and closing operation is not disabled due to freezing or the like.

In this way, with the wind turbine generator 1 of the present invention, under operating conditions where there is a need for a heating mode using the heating device 24, the velocity of wind flowing through the air intake port 12 is brought to about zero, the same state as when the ventilation port is substantially closed, or the ventilation port is opened and closed by means of the inflated balloon 40 or the air curtain, thus eliminating a mechanical movable structural part that becomes firmly seized by freezing or the like in a cold-region installation environment. Accordingly, even at a low outside air temperature, such as when the interior of the nacelle 3 is heated, no operation failure is caused by problems such as freezing, and the ventilation port is reliably closed to prevent low-temperature outside air from flowing in, thereby allowing efficient heating of the interior of the nacelle 3 by means of the heating device 24 such as a heater.

The present invention is not limited to the above-described embodiments; various modifications can be made without departing from the spirit thereof.

The invention claimed is:

1. A wind turbine generator, comprising:
   a driving and generating mechanism;
   a rotor head having a turbine blade, the rotor head connected to the driving and generating mechanism;
   a cooling device;
   a heating device;
   a nacelle having a ventilation port and an interior configured to house the driving and generating mechanism, cooling device, and heating device therein, the cooling device configured to ventilate the interior of the nacelle to prevent an increase in the temperature of the interior of the nacelle and the heating device configured to raise the temperature of the interior of the nacelle at a low outside air temperature, wherein
   the cooling device having a ventilating fan and configured to control a rotating direction and a rotational speed of the ventilating fan, wherein during the operation of the heating device, the rotating direction and the rotational speed of the ventilating fan are controlled so as to make a wind velocity at the ventilation port about zero.

2. The wind turbine generator according to claim 1, further comprising:
   a first inverter configured to set the rotating direction of the ventilation fan and a second inverter configured to set the rotational speed of the ventilating fan, and
   a wind-direction and wind-velocity detection part for measuring the flow direction and the flow velocity of air flowing through the ventilation port, the wind-direction and wind-velocity detection part configured to communicate the measured flow direction and flow velocity of air flowing through the ventilation port to the first inverter to set the rotating direction of the ventilation fan and to the second inverter to set the rotational speed of the ventilating fan.

* * * * *